3,218,535
SERVO-CONTROLLED SHAFT POSITION DEVICE
James E. Holthaus, Severna Park, and Marvin E. Hotchkiss and John H. Staehlin, Baltimore, Md., assignors, by mesne assignments, to the United States of America as represented by the Secretary of the Navy
Filed Apr. 3, 1963, Ser. No. 270,480
4 Claims. (Cl. 318—138)

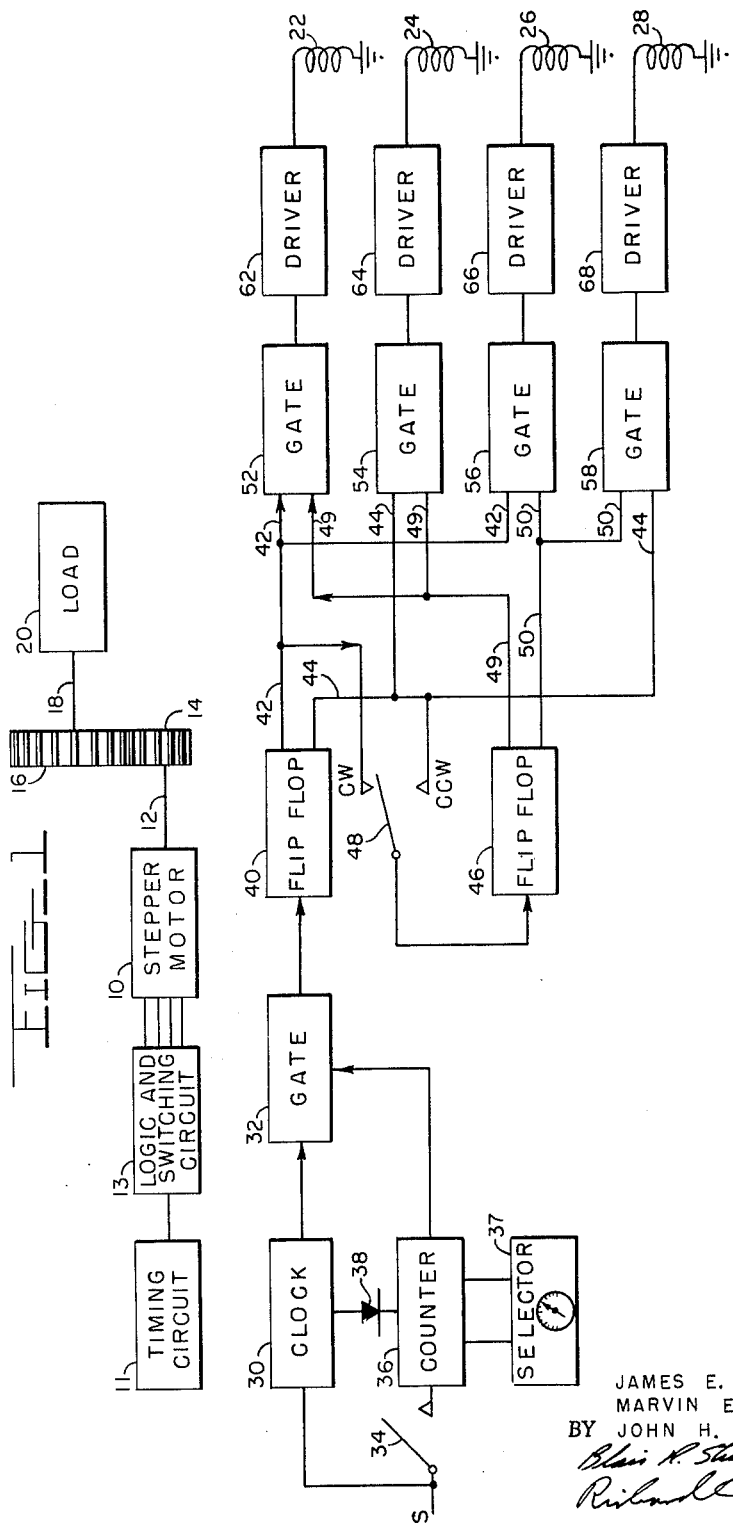

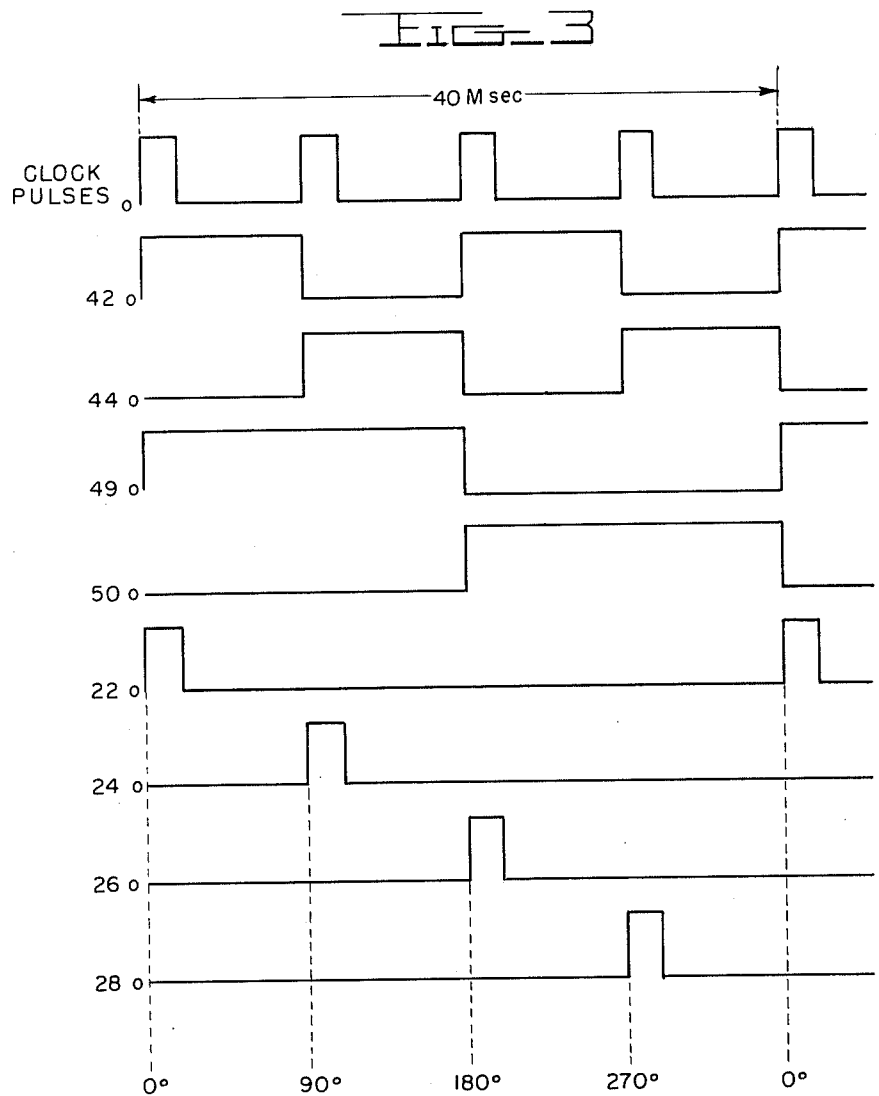

The present invention relates to a servo-controlled shaft rotating device and more particularly to an electronic, selectively positionable, discrete stepping device for accurately and quickly rotatively positioning a shaft or load.

Mechanically controlled devices for rotatively positioning a shaft or load are inherently slow and subject to wear to an extent that where precision accuracy is required, they soon become ineffective.

A further difficulty encountered with mechanical devices is the requirement for comparative nearness of an operator to the load or shaft being rotated in order to make the desired selection of position, or control the number of degrees of rotation.

It is often both necessary and desirious that the load or shaft to be rotatively positioned be located remote from the operator or for some other reason, be inaccessible. Examples of such use would be the stepped rotation of quarter wave plates in airborne radar antennas, or in the handling of radioactive materials, among others. Each of the specific examples requires remotely controlled, swift, and precise movement of such a degree that conventional mechanical positioning devices are inadequate.

The selectively positionable discrete stepping device of the present invention incorporates all of the necessary characteristics of speed, precision and remote operability presently lacking in the prior art devices into a small, compact, electromechanical device adapted to selectively rotatively position a shaft or load quickly and accurately.

Accordingly, it is an object of the present invention to provide a quick response servo-controlled shaft or load positioning device.

Another object is the provision of servo-controlled rotatively stepped shaft positioning means for accurately controlling the rotative position of a load.

A further object of the present invention is the provision of an open loop logic circuit for discretely and selectively stepping a shaft or load rotatively about its axis to a preselected position.

In the illustrated embodiment of the present invention there is provided a stepper motor geared to the load or shaft to be rotated and adapted to be actuated by a stream of timed pulses from a logic circuit to provide for the selective rotative positioning of the load or shaft.

These and other objects and many of the attendant advantages of the present invention will be readily appreciated when the following detailed description is considered in connection with the accompanying drawings in which:

FIG. 1 is a schematic drawing of the mechanical driving arrangement of the present invention;
FIG. 2 is a schematic view of the timing, logic and switching circuit of the present invention; and
FIG. 3 is a graph showing the timed relationship and pulse widths of the various electrical signals produced in the circuit of FIG. 2.

Referring now in detail to the drawings, wherein like reference characters represent like parts, and more particularly to FIG. 1, there is shown a stepper motor 10 which resembles a conventional A.-C. servomotor except that its winding is excited by a stream of pulses from a multivibrator or similar circuitry. Motor 10 is connected by a shaft 12 to driving gear 14 which directly drives gear 16 and its associated shaft 18 and load 20. In the illustrated embodiment the ratio of driven gear 16 to driving gear 14 is 12:1, which provides for 7.5° rotation of load 20 for each 90° rotation of motor 10. It will become more evident as this description progresses that the 12:1 gear ratio is employed for purposes of illustration only, and that various gear ratios may be utilized depending on the number of different shaft positions desired without departing from the scope of the present invention.

The stepper motor 10 includes four stator coils (FIG. 2) 22, 24, 26, and 28 which are actuated sequentially by pulses from a logic and switching circuit 13 in response to a selected number of clock pulses transmitted to the logic circuit by a timing circuit 11. Rotation of shaft 12 is obtained in 90° steps by pulsing each coil in succession until shaft 18 and load 20 have been rotated the desired number of degrees or to the desired position.

Referring now to FIG. 2 there is shown the novel timing, logic and switching circuits of the present invention. A source S provides the power for the circuit and is directly connected to a clock 30 in the form of a free-running multivibrator which transmits a narrow square wave pulse to gate 32 which is normally closed. Source S is connected to counter 36 through switch 34. Counter 36 is a basic hybrid timing multivibrator circuit whose output pulses control the opening and closing of gate 32 and which counts a preselected number of pulses from 1–24. A selector 37 is connected to counter 36 to permit selection by the operator of the number of pulses to be emitted by gate 32 before the closing thereof by counter 36. A diode circuit 38 connects the clock and counter. In operation, the timing circuit is set by selecting the number (from 1 to 24) of pulses desired on selector 37. Switch 34 is then closed so that power from source S is applied to energize counter 36 thereby enabling it to count the pulses from clock 30. When counter 36 is energized, gate 32 is opened by the concurrence of a clock pulse and a counter pulse. When the preselected count is reached, no pulses are received by the gate from the counter so that the gate is returned to its closed condition. Therefore clock 30, though freely running, is operationally ineffective until counter 36 is energized.

The logic circuit receives the narrow square wave clock pulses (FIG. 3) from the timing circuit at the input of flip flop 40. Flip flop 40 has a pair of output circuits 42 and 44 which are connected to a second flip flop 46 through a remotely operated two position switch 48 which controls the direction of rotation of shaft 18 and load 20. Output circuit 42 is connected to the CW or clockwise terminal of switch 48 while output circuit 44 is connected to the CCW or counterclockwise terminal of switch 48. Flip flop 46 has a pair of output circuits 49 and 50.

Four gate circuits 52, 54, 56, and 58 are connected at their inputs to one of the output circuits of each of flip flops 40 and 46; gate circuit 52 is connected at its inputs to output circuit 42 of flip flop 40 and output circuit 49 of flip flop 46; gate circuit 54 receives output circuit 44 of flip flop 40 and output circuit 49 of flip flop 46 at its inputs; gate circuit 56 is connected at its inputs to output circuit 42 of flip flop 40 and output circuit 50 of flip flop 46; and gate circuit 58 receives signal pulses at its inputs from output circuit 44 of flip flop 40 and output circuit 50 of flip flop 46.

When a positive signal is simultaneously received at both of the inputs of one of the gates 52, 54, 56, or 58 the gate is opened and the respectively associated coil 22, 24, 26, or 28 is actuated by a pulse through a driver amplifier 62, 64, 66, or 68, respectively, electrically connected therebetween. For example, when positive signal pulses are simultaneously transmitted from flip flop 40 through circuit 42, and from flip flop 46 through circuit 49, gate 52 is opened and a pulse transmitted to driver amplifier 62 to actuate coil 22. While many types of power amplifier circuits could be used for the drivers 62, 64, 66, and 68, the use of drive transistors for this function has been found particularly suitable for purposes of compactness in the practice of this invention.

Referring now to FIG. 3 there is shown the particular relationships and sizes of the various pulses emitted by the various elements of the circuit. Each waveform is identified by the number of the element in FIG. 2 where it appears. The waveforms are displayed one below the other to show their time relationship. It will be seen that during 40 milliseconds of pulses there will be four clock pulses emitted, from gate 32, two pulses of 10 msec. duration alternately emitted in each of outlet circuits 42 and 44, and a single pulse in each of outlets 49 and 50 of 20 msec. duration. The lower four waveforms of FIG. 3 display the relationship of the pulsing of each of the coils 22, 24, 26, and 28 to the respective flip flop outlet pulses shown above. It will be seen that each of the waveforms shown at 22, 24, 26, and 28 are positive when a different pair of the waveforms shown at 42, 44, 49, and 50 are positive.

In operation, a particular number of pulses, from 1 to 24, are selected on selector 37; since each pulse will cause shaft 12 to be rotated 90°, the angular displacement of shaft 18 and load 20 will be 7.5° for each clock pulse, due to the 12:1 gear ratio. Twenty-four pulses would then rotate shaft 18 and load 20 180° in either the clockwise or counterclockwise direction depending on the position of switch 48, thus enabling the shaft and load to be selectively positioned through 360°. Of course, it will be readily apparent to one skilled in the art, that the number of positions available is controlled only by the number of pulses which may be set on selector 37 and the gear ratio of gears 14 and 16, and the particular number of pulses and ratio employed in the illustrated embodiment are for purposes of description only and are nowise intended to limit the scope of the present invention.

Presuming for purposes of illustration that it is desired to reposition shaft 18 and load 20 45° in a clockwise direction, six is set on selector 37 to produce six pulses (6×7.5°=45°), switch 48 is placed in the CW position and switch 34 closed. Upon closing switch 34, counter 36 will start clock 30 running, gate 32 being then open will transmit the clock pulses to flip flop 40 until six pulses have been counted by counter 36 and it transmits its closing pulse to gate 32. Flip flop 40 will alternately transmit signal pulses of 10 msec. duration in output circuits 42 and 44. Flip flop 46 will receive only those pulses existing in output circuit 42, due to the CW position of switch 48; were switch 48 in the CCW position, actuation of flip flop 46 would be through output circuit 44. As can be seen in FIG. 3, two of the four output circuits are always emitting a positive pulse; when 42 and 49 are positive, gate 52 is opened activating coil 22; when 49 and 44 are positive, gate 54 is opened actuating coil 24; when 42 and 50 are positive, gate 56 is opened actuating coil 26; and when 44 and 50 are positive gate 58 is opened actuating coil 28. It will be further apparent from FIG. 3 that the six pulses of the example will cause the coils to be pulsed in the sequence 22–24–26–28–22–24 thus requiring 60 msec. for the fixed repositioning of shaft 18 and load 20 45° in the clockwise direction. The maximum time therefore for the illustrated embodiment to reposition the load 20 and shaft 18 to any position throughout 360 degrees would be 240 msec. (24 pulses×10 msec./pulse.)

It will be apparent that if it is desired to rotate the load 20 in the counterclockwise direction, that switch 48 would be placed in the CCW position, thus causing output circuit 44 to actuate flip flop 46 and hence causing output circuits 44 and 50 to go positive first resulting in a sequence of coil actuation for 6 pulses to be 28–26–24–22–28–26. This is depicted in FIG. 3 by reading from right to left rather than left to right as for clockwise rotation.

It can be seen from the foregoing that the servo-controlled shaft rotating device of the present invention provides a means for quickly rotatively positioning a shaft or load in discrete accurate steps with a compact electromechanical system which may be operated from a remote position without hazard from or accessibility to the load being positioned.

Obviously many modifications and variations of the present invention are possible in light of the above teachings. It is therefore to be understood that the scope of the present invention is to be limited only by the appended claims and not otherwise.

What is claimed is:

1. A device for remotely, selectively and accurately angularly displacing and positioning a load comprising:
    (a) a stepper motor having an output shaft and a plurality of separately actuated stator coils for providing stepped rotation of the motor output shaft,
    (b) gear means coupled to said output shaft for transmitting angular displacement from said output shaft to the load to be positioned,
    (c) clock means for generating pulses,
    (d) gating means for gating the pulses from said clock means,
    (e) counting means for counting the number of pulses to be gated by said gating means,
    (f) a first flip-flop coupled to receive the pulses from said gating means, said first flip-flop having first and second output circuits,
    (g) a second flip-flop having third and fourth output circuits,
    (h) switch means coupled between said first flip-flop and said second flip-flop for connecting either said first or second output circuit to said second flip-flop,
    (i) first, second, third and fourth gate circuits, each having a first and second input and output, said first and third gate circuits having their first input coupled to said first output circuit of said first flip-flop, said second and fourth gate circuits having their first input coupled to said second output circuit of said first flip-flop, said first and second gates having their second inputs coupled to the third output circuit of said second flip-flop, and said third and fourth gates having their second inputs coupled to the fourth output circuit of said second flip-flop, and (j) four driver amplifiers, each of said driver amplifiers coupled between one of said gate circuits and a stator coil of said stepper motor.

2. A device as set forth in claim 1 further including means coupled to said counting means for preselecting the number of pulses to be counted.

3. A device as set forth in claim 1 wherein said switch means is a manually controlled single-pole double-throw switch.

4. A device as set forth in claim 3 further including means coupled to said counting means for preselecting the number of pulses to be counted.

References Cited by the Examiner
UNITED STATES PATENTS

| | | | |
|---|---|---|---|
| 3,024,399 | 3/1962 | Valentino | 318—443 X |
| 3,041,516 | 6/1962 | Bailey | 310—49 X |
| 3,117,268 | 1/1964 | Madsen | 318—443 X |
| 3,124,732 | 3/1964 | Dupy | 318—138 |
| 3,165,684 | 1/1965 | Ensink et al. | 310—49 X |

JOHN F. COUCH, *Primary Examiner.*